(No Model.) 3 Sheets—Sheet 2.

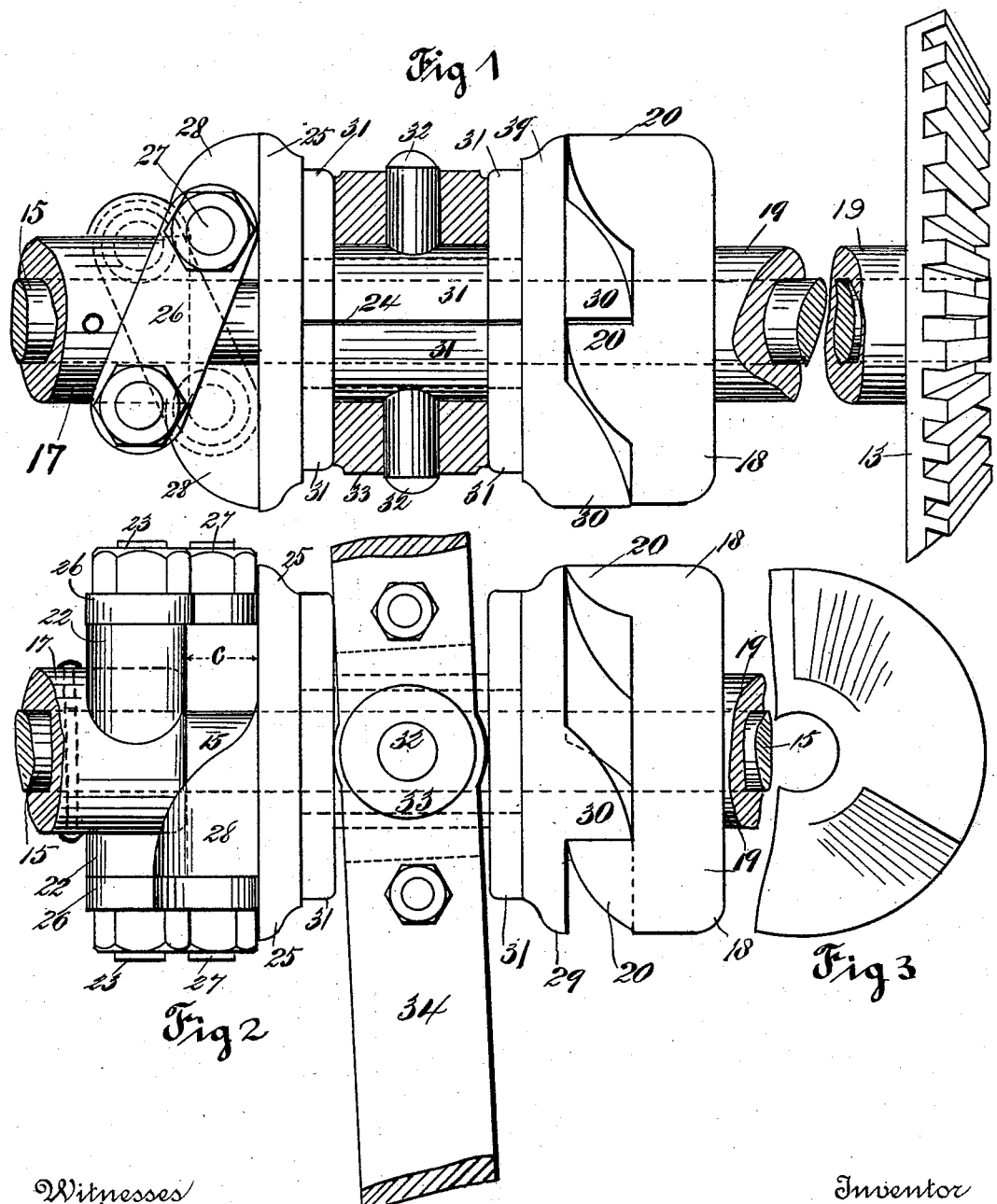

J. B. ALLFREE.
CLUTCH COUPLING.

No. 522,395. Patented July 3, 1894.

Witnesses Inventor
James B Allfree
By his Attorney
Thompson & Bell (No Model.) 3 Sheets—Sheet 3.

J. B. ALLFREE.
CLUTCH COUPLING.

No. 522,395. Patented July 3, 1894.

Witnesses
Inventor
James B. Allfree
By his Attorney

UNITED STATES PATENT OFFICE.

JAMES B. ALLFREE, OF INDIANAPOLIS, INDIANA.

CLUTCH-COUPLING.

SPECIFICATION forming part of Letters Patent No. 522,395, dated July 3, 1894.

Application filed June 5, 1893. Serial No. 476,662. (No model.)

*To all whom it may concern:*

Be it known that I, JAMES B. ALLFREE, a citizen of the United States, residing at Indianapolis, in the county of Marion and State of Indiana, have invented new and useful Improvements in Clutch-Couplings, of which the following is a specification.

My invention relates to new and useful improvements in coupling clutches and is designed particularly for use in connection with the packing or auger shafts of flour packing machines or other shafts subjected to similar working conditions.

The object of my invention is to provide a clutch that will, at all times, tend to disengage to stop the shaft to which it is connected, particularly the auger or packing shaft of flour packing machines, thereby rendering the degree of sensitiveness, accuracy of adjustment, and promptness in action perfect. I attain these objects by means of the clutch illustrated in the accompanying drawings in which similar numbers of reference designate like parts throughout the several views.

Figure 4:
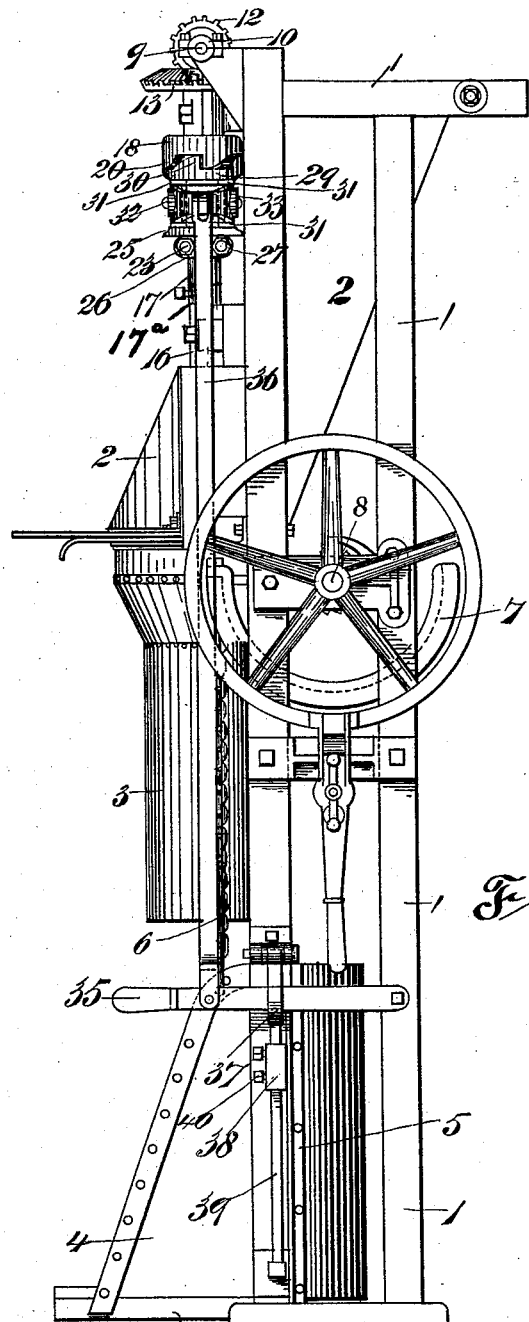
Figure 5:
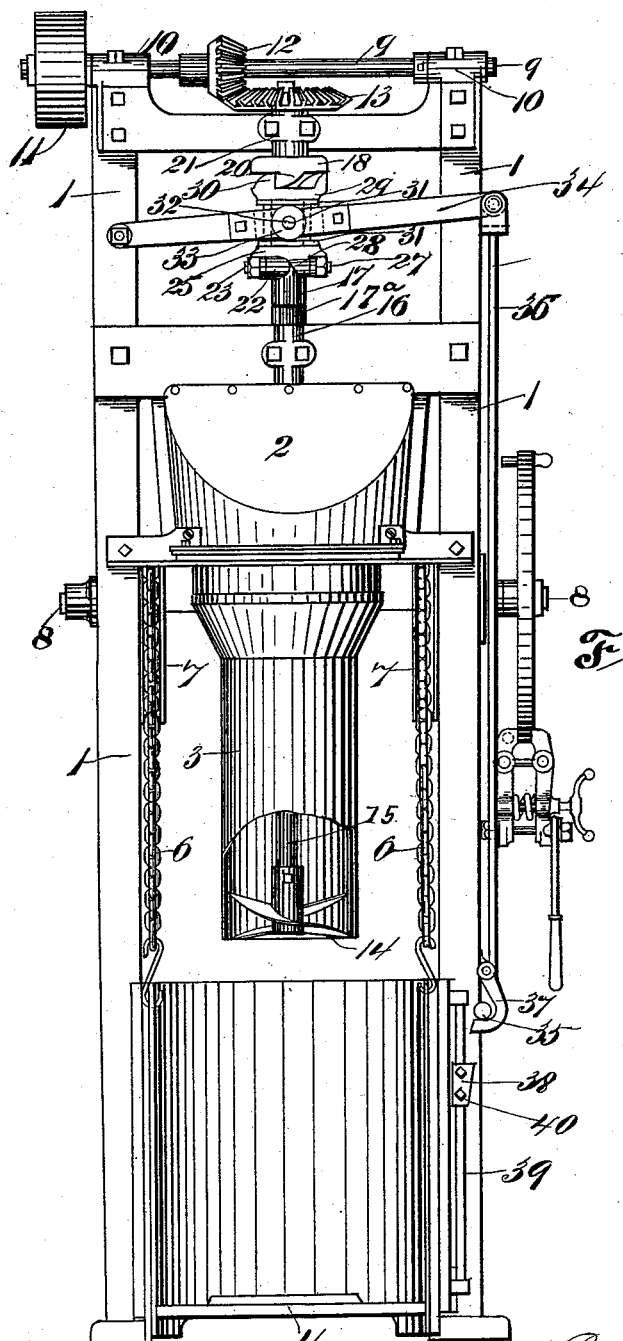

Figure 1. is a detail view of my clutch showing the clutch fork thereof in section. Fig. 2. is a similar view taken in a plane at right angles to that of Fig. 1. Fig. 3. is a part end view of the clutch showing the engaging jaws thereof. Fig. 4. is a side elevation of a flour packing machine showing the clutch applied to the vertical packing shaft thereof; and Fig. 5. is a front elevation of the same.

Referring to the drawings 1. designates the main frame of a flour packing machine, to which is firmly secured the hopper 2. and the packing tube 3. The descending platform 4, of the flour-packing machine, is adapted to slide upwardly and downwardly on suitable guides 5. secured on the main frame 1. and has its weight counterbalanced and supported by the supporting chains 6 secured on the counterbalance segments 7. of the counterbalance shaft 8, which is actuated by a suitable coil spring surrounding it or a suitable weight and chain on a chain wheel.

The driving shaft 9, is mounted in the journals 10, and is provided with the driving pulley 11, and the bevel pinion 12. meshing with the bevel wheel 13.

The auger 14, is of the well known helical blade type, and is secured on the lower end of the packing shaft 15. The shaft 15 is mounted in the bearings 16, and held from moving longitudinally therein by the sleeve or collar 17ª, of the lower fixed portion or sleeve 17 of the clutch.

The engaging and disengaging clutch, which is the main feature of my invention, is composed of the upper disk or flange 18, securely mounted on the sleeve 19, of the bevel-wheel 13, (see Fig. 1.) or it may be formed integral therewith; said flange 18 provided with the clutch teeth 20, formed with their engaging teeth which have their engaging surfaces parallel with the axis of the sleeve 19 in a longitudinal direction and radial with said axis in a transverse direction with said axis. The sleeve 19, is adapted to loosely receive the top end of the auger or packing shaft, 15, around which it rotates during the periods of disengagement of said auger shaft or the inaction of the latter.

The clutch sleeve 17. is firmly secured on the auger shaft 15. and is provided with the bosses 22, in which are securely screwed the link-studs 23.

The clutch sleeve 24, is provided with the flange 25, formed integral thereon; said sleeve loosely mounted on the shaft 15, is adapted to turn therewith and slide longitudinally thereon, and is held or retained to turn with the said shaft 15, by means of the retaining links 26, pivoted on the studs 23, and to the studs 27, securely screwed into the bosses 28, formed on the said flange 25. The opposite end of the sleeve 24, has formed integral thereon the flange 29, which is provided with the clutch teeth 30, adapted to engage and to disengage the clutch teeth 20, of the rotating or driving clutch 18.

On the clutch sleeve 24, and between the flanges 25, and 29, thereof, is mounted the clutch box 31, composed of two half boxes or sections each of which has the trunnions 32, formed integral thereon and arranged diametrically opposite each other to align and accurately fit their journals 33, formed on the clutch lever 34. The clutch-lever 34, is pivoted at its fulcrum end to the frame 1, of the machine, and is connected at its opposite end to the throw out lever 35, by the connecting-rod 36. The throw-out lever 35, is pivoted on the main frame 1, of the machine and supported and retained in its upper position (to retain the clutch in gear) by means of its sustaining hook or link 37, also pivoted on the main frame 1, of the machine. The sustaining hook 37, is thrown out of disengagement with the lever 34, by the throw-out cam 38, adjustably secured on the rod 39, of the descending platform of the machine, by the set screws 40, and may be adjusted by raising or lowering to increase or decrease the period of packing suitable to the capacity of the various receptacles into which the flour or other material is packed.

The operation of the coupling and its automatic operating mechanism is as follows:— The sleeve-clutch 18, is rotated continuously while the machine is in operation. To rapidly connect the auger-shaft 15 to operate the auger 14, to pack, the throw-out lever 35, is raised to rest on or be supported by its sustaining link or hook 37, to retain the clutch teeth 30, in gear with the teeth 20, of the clutch 18, by which said shaft is held to rotate. The sliding clutch 24, being connected to the hub or sleeve 17, by the retaining pivotal or drag links 26, rotates the auger shaft 15 whereon the auger 14 is secured. The platform 4, descends as the flour or other material is forced or packed into the receptacle placed thereon till the cam block 38, contacts with the engaging hook 37, to throw it outwardly to disengage the lever 35, thereby automatically disengaging the clutch teeth 30, and 20, of the clutches and bringing the shaft 15, and its auger 14, to a state of rest thereby promptly stopping the operation of packing and wasting the material.

It will be observed that the pivotal retaining links 26, of the clutch connect the auger shaft 15, positively with the sliding clutch, but permit the latter to be moved longitudinally with said shaft, at the same time, causing a slight rotation of the clutches (top and bottom) in opposite directions when traversed longitudinally to disengage, thereby causing the engaging surfaces of the clutch teeth 30, and 20, to separate or recede from each other; this latter movement will readily be seen on inspecting the enlarged detail drawing, see Fig. 1, where it will be seen this movement is produced and results from the arcs described, the radial links or retaining links, 26, describing similar arcs and thereby increasing the distance apart of two fixed points on the peripheries of the pieces 18, and 29, by which rotative movement the prompt action of the clutches is secured and the sensitiveness of said clutch is increased to a maximum.

Having thus fully described the operation of my invention, what I claim as new and useful, and desire to cover by Letters Patent of the United States therefor, is—

1. In a clutch coupling, the combination with a rotating shaft, and a clutch mounted thereon, of an engaging and disengaging clutch mounted on said shaft and adapted to slide longitudinally thereon and to rotate therewith, and suitable drag or retaining links pivoted to said clutch and to said shaft at their ends, substantially as set forth.

2. In a clutch coupling, the combination with a fixed rotative clutch and a shaft loosely mounted in said fixed clutch, of an engaging and a disengaging clutch mounted on said shaft and adapted to slide longitudinally thereon and to turn therewith, pivotal retaining or drag links on opposite sides of said shaft and pivoted at their ends to said sliding clutch and shaft, and suitable means for moving said clutch longitudinally to automatically disengage, substantially as set forth.

3. In a flour packing machine, the combination with a fixed rotative clutch, a shaft loosely mounted in said clutch, and an engaging and disengaging clutch mounted on said shaft and adapted to slide longitudinally therein and to turn therewith, of retaining or drag links on opposite sides of said shaft and having their ends pivotally secured to said sliding clutch and to said shaft, of a descending platform, the disengaging link 35, the throw-out hook 37, the clutch link 34, and the connecting-rod 36, all combined and arranged to co-operate, substantially as and for the purpose set forth.

In testimony whereof I have hereunto set my hand in the presence of two subscribing witnesses.

JAMES B. ALLFREE.

Witnesses:
THOMPSON R. BELL,
JNO. GEO. THRETT.